United States Patent [19]

Cornellier

[11] 4,015,408
[45] Apr. 5, 1977

[54] SAFETY GUARD FOR ROTARY-TYPE CUTTER

[76] Inventor: Maurice H. Cornellier, 7039 Pinhurst, Dearborn, Mich. 48126

[22] Filed: Mar. 29, 1976

[21] Appl. No.: 671,399

[52] U.S. Cl. .................................. 56/295; 56/17.4
[51] Int. Cl.² ......................................... A01D 55/18
[58] Field of Search ............................ 56/295, 17.4

[56] References Cited
UNITED STATES PATENTS 3,399,519  9/1968  Buchanan ........................... 56/295

*Primary Examiner*—J.N. Eskovitz
*Attorney, Agent, or Firm*—Hauke & Patalidis

[57] ABSTRACT

A safety guard assembly for a rotary-type cutter such as the cutting blade of a rotary lawn mower. The safety guard assembly is in the form of a cage made of a plurality of parallelly disposed non-cutting individual guard members surrounding the cutting blade about its cutting edge and disposed along cylindrical surfaces perpendicular to the plane of rotation of the blade. The guard members project beyond the tip of the cutting edge and below the blade and have a gently curvilinear edge surface for deflecting solid objects in the path of the cutting edge or for permitting the blade to ride over solid objects, such as to minimize projection of stones and the like, and to deflect and minimize damages or injury to a hand or a finger accidentally placed in the path of the cutter blade. Preferably, the safety guard assembly is supported by a mounting plate removably fastened on the bottom of the cutter blade.

9 Claims, 7 Drawing Figures

SAFETY GUARD FOR ROTARY-TYPE CUTTER

BACKGROUND OF THE PRESENT INVENTION

The present invention relates to safety guard devices for rotating cutters, and more particularly the present invention relates to improved safety guard assemblies for the cutter blade of rotary-type mowing machines such as lawn mowers and the like. Rotary cutter lawn mowers utilize a rectangular substantially flat cutter blade mounted within a shroud or housing closed at its top and periphery, and open at its bottom. The shroud or housing is often provided with a discharge aperture or chute for laterally discharging the cut grass. The rotating blade is mounted at its center on the end of a vertically disposed shaft, directly driven by a prime mover such as a small internal combustion engine, electric motor or the like, or driven from the prime mover by any appropriate means such as a pulley and V-belt drive or the like. The rotating blade has a portion of its leading edge on each end ground to a sharp cutting edge, such as to continuously cut the grass to a certain height along the path of travel of the mower.

Such rotary mower devices are prone to be damaged as a result of the cutter blade impacting upon objects hidden in the grass of disposed in the path of the mower, such as stones, tree branches and the like. Upon impact with such an object, the cutting edge of the cutter blade is damaged, and loose pebbles, stones or other hard objects are projected as a result of impacting with and being propelled by the rapidly rotating blade with a relatively high velocity which may cause injuries to the operator of the mower and persons standing by, or which may cause property damages. It is not uncommon for the hand or a finger, or the foot, of a person or child, or for a domestic animal to be caught in the path of the rotating cutter blade, with considerable injuries thus resulting.

There is consequently a need for a safety guard device for rotary type cutter blades such as are used in rotary grass mowers, and the like, to prevent accidental contact of the cutting edge of the rapidly rotating cutter blade with an object other than the grass to be cut and, alternatively or in addition, for permitting the blade to ride over an immovable obstacle without seriously deteriorating the blade cutting edge or the blade itself.

SUMMARY OF THE INVENTION

The present invention permits to accomplish such results by providing a safety guard assembly substantially in the form of a cage disposed around the end portion of the rotary cutter blade provided with a sharp cutting edge, while still permitting exposed portions of the cutting edge to engage and cut grass and acting both as protection means for the cutting edge of the blade and as deflection means preventing contact of the cutting edge with foreign objects.

The diverse objects and advantages of the present invention will become apparent to those skilled in the art when the following description of the best modes contemplated for practicing the invention is read in conjunction with the accompanying drawing wherein:

DETAILED DESCRIPTION OF THE PREFERRED EMBODIMENTS

Figure 1:
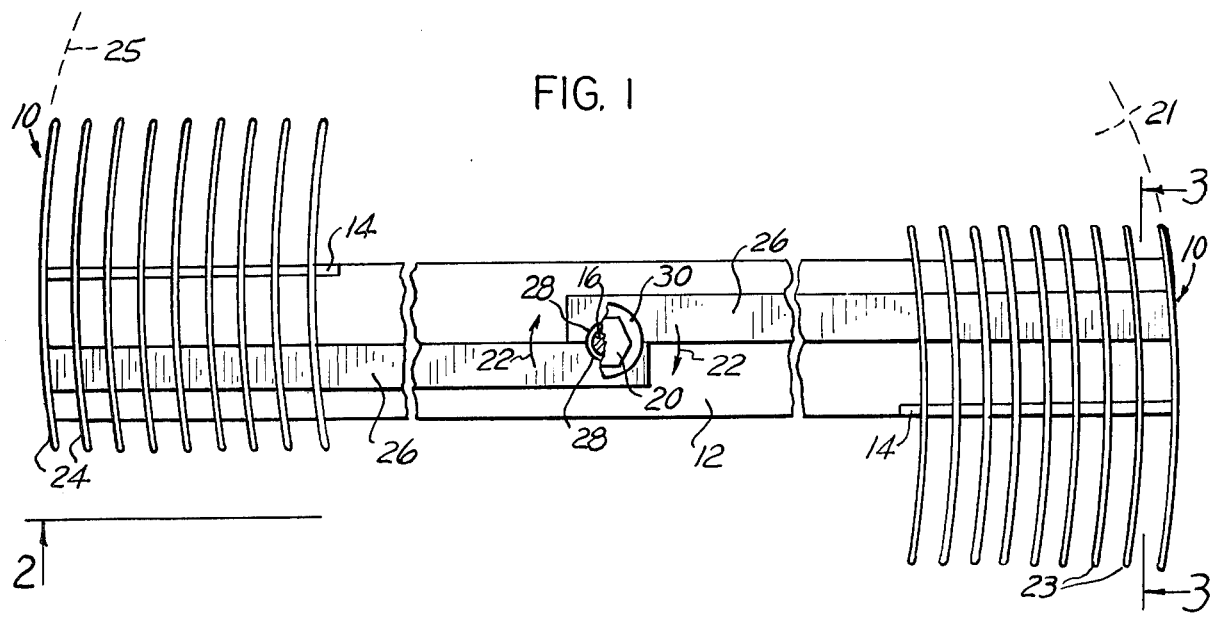
FIG. 1 is a plan bottom view of a rotary cutter blade provided with the safety guard assembly of the present invention.
Figure 2:
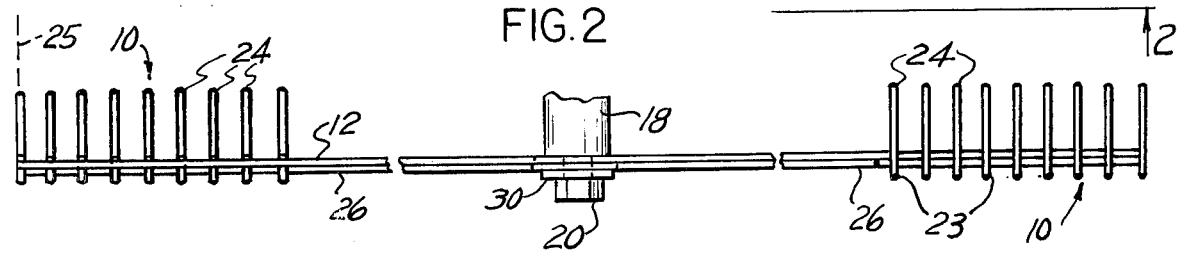
FIG. 2 is an elevation view thereof from line 2—2 of FIG. 1.

Referring now to FIGS. 1 and 2, a safety guard assembly according to the present invention and designated generally by numeral 10, is shown mounted on the rotary cutter blade 12 of a lawn mower or other device, not shown. The rotary cutter blade 12 is in the form of a rectangular flat plate, preferably made of steel, and provided proximate each end thereof with a leading cutting edge 14 obtained by sharpening a portion of the leading edge at a bevel. The rotary cutter blade 12 is provided with a mounting aperture 16 for fastening on the end of a rotating shaft 18, FIG. 2, in a well known manner by means of a bolt 20 whose body is passed through the mounting aperture 16 and threaded into an appropriate threaded bore on the end of the shaft 18. The shaft 18 is rotated directly by a prime mover such as a small internal combustion engine or electric motor, not shown, or alternatively, the shaft 18 is provided with an appropriate drive such as pulleys and belts connecting it to the output of a prime mover. A housing or shroud, not shown, surrounds the cutter blade 12, the shroud being generally closed on the top and on its periphery, such arrangement being well known and not illustrated for the sake of simplicity. The rotary cutter blade 12 is normally driven in rotation, for example in the direction of the arrows 22, in a normally horizontal circular plane 21, and it is longitudinally displaced above the ground such that the rotary cutter blade 12 cuts off the top of grass blades having grown to a height greater than the predetermined height at which the mower has been set.

The present invention contemplates that the safety guard assemblies, or cages, 10 be disposed over the ends of the rotary cutter blade 12 so as to form an enclosure protecting the cutting edge 14 of the blade while still exposing portions of the cutting edge 14 for impact upon, and for cutting off, the grass. Each safety guard assembly consists of a plurality of non-cutting plate members 24, preferably made of metal, stiff plastic or like material, disposed parallel to each other, substantially like the teeth of a comb. Characteristically each guard member 24 may have a thickness of approximately one eighth of an inch, and a plurality of such members forming each safety guard assembly 10 at each end of the rotary cutter blade 12 may be mutually spaced one half to three quarters of an inch. Each guard member is provided with a rounded peripheral edge 23, so as to be non-cutting and, as shown at FIG. 1, has preferably a slightly arcuate shape along a cylindrical surface 25 perpendicular to the plane of rotation 21 of the cutter blade 12, such cylindrical surface 25 having a diameter substantially equal to the length of the cutter blade 12.

The plurality of guard members 24 forming a single safety guard assembly 10 are supported in position by means of a mounting plate 26 fastened below the rotary cutter blade 12. Each mounting plate 26 has an end provided with a semi-circular cut-out portion 28 normally disposed about a portion of the body of the blade mounting bolt 20, a washer 30 being placed below the head of the bolt 20, such that when the bolt 20 is tightened, a pair of mounting plates 26, each with a safety guard assembly 10 fastened on the free end thereof, is removably attached and caused to rotate in unison with the cutter blade 12.

Figure 3:
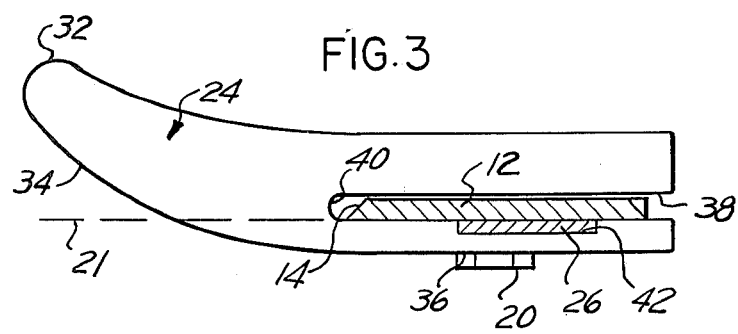
FIG. 3 is a detailed enlarged section from line 3—3 of FIG. 1.

As shown in detail in FIG. 3, each safety guard member 24 is in the form of an elongated plate having a curved or rounded leading tip 32 disposed above the plane of rotation 21 of the rotary cutter blade 12, and a curvilinear lower edge 34 connecting the rounded or curved leading tip 32 to a substantially straight bottom edge 36. An open ended slot 38 is formed substantially parallel to the straight bottom edge 36 a short distance therefrom. The slot 38 has a width accepting the cutter blade 12 with the sharp edge 14 of the blade abutting or disposed proximate the closed end 40 of the slot 38, the other end of the slot 38 being open to the rear of the safety guard member 24. The slot 38 is provided with a cut-out portion 42 in which is passed the mounting plate 26, the safety guard member 24 being welded or otherwise fastened to the mounting plate 26 in position as shown. In this manner, a plurality of safety guard members 28 are fastened in assembly by welding or the like and are supported by each mounting plate 26.

Figure 4:
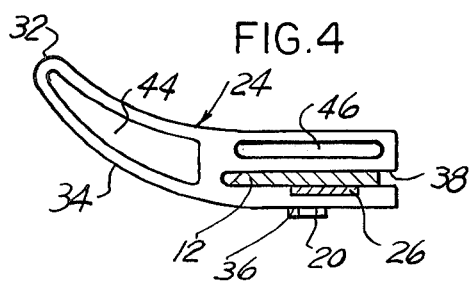
FIG. 4 is a view similar to FIG. 3 but showing a modification of the invention.

FIG. 4 illustrates a modification of safety guard member 24 identical to the safety guard member 24 of FIG. 3 but provided with cut-out portions 44 and 46 from which the material of the plate forming the safety guard member 24 has been removed to decrease the weight and inertia of the safety guard member.

Figure 5:
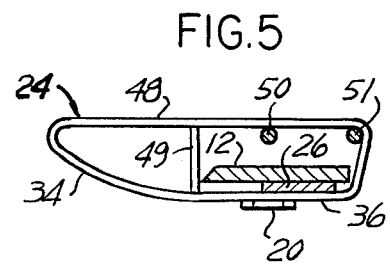
FIG. 5 is a view similar to FIG. 3 but showing a further modification of the invention.

FIG. 5 illustrates a further modification wherein each safety guard member 24 is made in the form of an open frame 48 of steel rod, or like material, of relatively small diameter, bent in shape, each member 24 being provided with a lateral, i.e., vertically extending short rod 49, as seen in the drawing, welded to the frame 48 for increasing the strength and rigidity of the shaped frame, the support plate member 26 supporting a plurality of such members 24 welded in place, as shown. Preferably, the safety guard members 24 made each of a frame 48 are connected together at their upper portions by means of transverse rods 50 and 51 also welded thereto to each frame 48 in order to further increase the rigidity and sturdiness of the safety guard or cage assembly.

Figure 6:
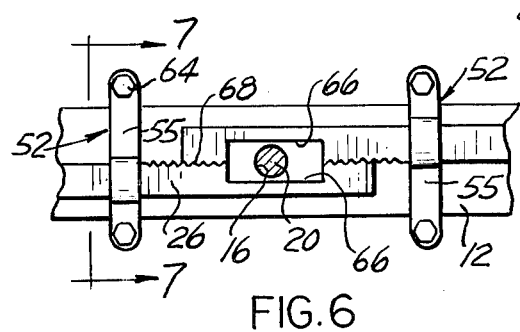
FIG. 6 is a plan bottom view of the arrangement shown at FIG. 1 but showing a modification thereof.
Figure 7:
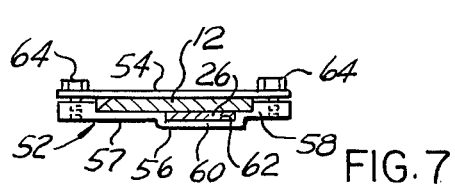
FIG. 7 is a section along line 7—7 of FIG. 6.

Although the slot 38 of the safety guard member 24 of FIGS. 3 and 4 has been shown as an open slot such that the members 24 may be mounted over and around cutter blades 12 of different widths, it will be apparent that the slot 38 may also be closed at the rear end such as to provide a means of holding the assembly 10 in position by the single clamping action of the bolt 20 and washer 30. However, as illustrated at FIGS. 6 and 7, auxiliary clamping means may be provided for clamping the safety guard mounting plates 26 to the bottom surface of the rotary cutter blade 12 at a position intermediary between the safety guard assemblies and the blade and safety guard assembly mounting bolt 20. Such clamping means consist of a flat plate member 54 disposed in engagement with the upper surface of the rotary cutter blade 12 and a lower contoured plate 56 having portions 57 and 58 aligned in a plane corresponding to the lower surface of the rotary cutter blade 12, and an intermediary bent over portion 60 forming a pocket 62 accepting and holding in position the mounting plate 26. Appropriate fasteners, such as screws or bolts 64, are used on each end of the plates 54 and 55 projecting beyond the edges of the rotary cutter plate 12 such that by driving the screws or bolts 64 the mounting plates 26 are forceably engaged with the lower surface of the rotary cutter blade 12, each mounting plate 26 being disposed in the pocket 62 such as being immobilized against any motion, longitudinal as well as lateral.

Preferably, the end of each mounting plate 26, as shown at FIG. 6, has a rectangular cut-out portion 66 so as to afford clearance for the passage of the blade mounting bolt 20, and the abutting edges of the mounting plates 26 on each side of the rectangular cut-out portion 66 are provided with interlocking means, for example V-shaped, teeth 68, further preventing longitudinal motion of one mounting plate 26 relative to the other under the action of centrifugal force, while the rotary cutter blade 12 is rotated at high velocity, in spite of the clamping action of the mounting bolt 20 and washer 30. Such a structure permits a pair of identical safety guard assemblies with their respective identical mounting plates 26 to form a complete safety guard assembly arrangement for rotary cutter blades of diverse lengths within a range, with the last one of the safety guard members 24 peripherally disposed along the terminal edge of the rotary cutter blade 12.

Although the invention has been described and illustrated in terms of a safety guard assembly removably fastened to a rotary cutter blade, it will be appreciated that the safety guard members 24 may be fastened, such as by welding, directly onto the cutter blade 12 over the ends thereof provided with a cutting edge 14. Such an arrangement complicates only slightly the resharpening of the cutting edge 14, as the spacing between consecutive guard members 24 is wide enough to afford access to the cutting edge 14 by a small flat hand file or by a small hand held rotary file or grinding wheel.

Having thus described the present invention by way of specific examples of structures forming practical embodiments thereof, modifications whereof will be apparent to those skilled in the art, what is claimed as new is as follows:

1. A safety guard assembly for rotary-type cutter blade adapted to rotate in a substantially horizontal plane about a vertically disposed shaft, said cutter blade having at least a portion of a leading edge with respect to the direction of rotation of said cutter blade sharpened to form a cutting edge, said safety guard assembly comprising a plurality of parallelly disposed individual guard units each formed of a non-cutting guard member disposed such as to surround said cutter blade at said cutting edge in a plane substantially perpendicular to the plane of rotation of said cutter blade, each of said non-cutting guard members having a curvilinear lower edge extending forwardly of said cutting edge from above said plane of rotation to below said plane of rotation directly below said cutting edge, said curvilinear edge extending forwardly to a curved tip, and means for rigidly supporting said plurality of said non-cutting guard members on said cutter blade in mutually spaced relationship so as to leave exposed portions of said cutting edge between each pair of consecutive non-cutting guard members.

2. The safety guard assembly of claim 1 wherein the plane substantially perpendicular to the plane of rotation of the cutter blade is in the form of a circularly cylindrical surface of diameter substantially equal to the diameter of the plane of rotation of said cutter blade.

3. The safety guard assembly of claim 1 wherein said non-cutting guard members are each made of a plate having an open slot disposed proximate the lower edge thereof and extending to the rear edge thereof, said slot being substantially parallel to the lower edge of said non-cutting guard member and said cutting edge being normally proximate to the closed end of said slot.

4. The safety guard of claim 3 wherein said non-cutting guard members are each provided with at least one cut-out portion for decreasing the weight of said member.

5. The safety guard assembly of claim 1 wherein each of said non-cutting guard members is in the form of a frame made of relatively small diameter rod material.

6. The safety guard assembly of claim 1 wherein said non-cutting guard members are affixed to a mounting plate and further comprising means for removably attaching said mounting plate to said cutter blade below said cutter blade.

7. The safety guard assembly of claim 6 wherein said attaching means comprises a fastener normally mounting said cutting blade to said shaft.

8. The safety guard assembly of claim 7 wherein said mounting means further comprises clamping means attaching said mounting plate to said cutter blade intermediary of said fastener and said assembly.

9. The safety guard assembly of claim 6 wherein said mounting plate is made of a pair of identical plate sections supporting said non-cutting guard members on an end thereof, the other end of each plate sections having corresponding side edges forming interlocking means affording a predetermined amount of length adjustment of said mounting plate prior to attachment to said cutter blade.

* * * * *